United States Patent
Kim et al.

(10) Patent No.: US 9,902,850 B2
(45) Date of Patent: Feb. 27, 2018

(54) THERMOPLASTIC RESIN COMPOSITION

(71) Applicant: Samsung SDI Co., Ltd., Yongin-si (KR)

(72) Inventors: Bo Eun Kim, Uiwang-si (KR); Joo Hyun Jang, Uiwang-si (KR); Kwang Soo Park, Uiwang-si (KR); Jae Won Heo, Uiwang-si (KR); Young Sub Jin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/747,207

(22) Filed: Jun. 23, 2015

(65) Prior Publication Data

US 2015/0376392 A1 Dec. 31, 2015

(30) Foreign Application Priority Data

Jun. 26, 2014 (KR) .................. 10-2014-0078894
Oct. 15, 2014 (KR) .................. 10-2014-0139220

(51) Int. Cl.
C08L 33/20 (2006.01)
C08L 51/04 (2006.01)
C08L 25/12 (2006.01)
C08L 35/06 (2006.01)

(52) U.S. Cl.
CPC .............. C08L 33/20 (2013.01); C08L 25/12 (2013.01); C08L 35/06 (2013.01); C08L 2201/02 (2013.01); C08L 2205/025 (2013.01); C08L 2205/03 (2013.01); C08L 2207/04 (2013.01); C08L 2207/53 (2013.01)

(58) Field of Classification Search
CPC .. C08L 51/085; C08L 25/12; C08L 2205/025; C08L 2205/05
See application file for complete search history.

(56) References Cited

U.S. PATENT DOCUMENTS

| | | |
|---|---|---|
| 3,322,853 A | 5/1967 | Trementozzi et al. |
| 3,742,092 A | 6/1973 | Duke et al. |
| 3,839,513 A | 10/1974 | Patel |
| 3,898,300 A | 8/1975 | Hillard |
| 4,027,073 A | 5/1977 | Clark |
| 4,045,514 A | 8/1977 | Iwahashi et al. |
| 4,062,909 A | 12/1977 | Morgan et al. |
| 4,102,853 A | 7/1978 | Kawamura et al. |
| 4,117,041 A | 9/1978 | Guschl |
| 4,287,315 A | 9/1981 | Meyer et al. |
| 4,303,772 A | 12/1981 | Novicky |
| 4,391,935 A | 7/1983 | Bialous et al. |
| 4,400,333 A | 8/1983 | Neefe |
| 4,460,742 A | 7/1984 | Kishida et al. |
| 4,466,912 A | 8/1984 | Phillips et al. |
| 4,632,946 A | 12/1986 | Muench et al. |
| 4,634,734 A | 1/1987 | Hambrecht et al. |
| 4,652,614 A | 3/1987 | Eichenauer et al. |
| 4,659,790 A | 4/1987 | Shimozato et al. |
| 4,668,737 A | 5/1987 | Eichenauer et al. |
| 4,692,488 A | 9/1987 | Kress et al. |
| 4,745,029 A | 5/1988 | Kambour |
| 4,757,109 A | 7/1988 | Kishida et al. |
| 4,883,835 A | 11/1989 | Buysch et al. |
| 4,906,696 A | 3/1990 | Fischer et al. |
| 4,914,144 A | 4/1990 | Muehlbach et al. |
| 4,918,159 A | 4/1990 | Nakamura et al. |
| 4,983,658 A | 1/1991 | Kress et al. |
| 4,988,748 A | 1/1991 | Fuhr et al. |
| 4,997,883 A | 3/1991 | Fischer et al. |
| 5,025,066 A | 6/1991 | DeRudder et al. |
| 5,061,558 A | 10/1991 | Fischer et al. |
| 5,061,745 A | 10/1991 | Wittmann et al. |
| 5,091,470 A | 2/1992 | Wolsink et al. |
| 5,200,492 A | 4/1993 | Ohnaga et al. |
| 5,204,394 A | 4/1993 | Gosens et al. |
| 5,206,404 A | 4/1993 | Gunkel et al. |
| 5,218,030 A | 6/1993 | Katayose et al. |
| 5,219,907 A | 6/1993 | Niessner et al. |
| 5,229,443 A | 7/1993 | Wroczynski |
| 5,237,004 A | 8/1993 | Wu et al. |
| 5,239,001 A | 8/1993 | Fischer et al. |
| 5,274,031 A * | 12/1993 | Eichenauer .......... C08L 51/04 525/64 |
| 5,280,070 A | 1/1994 | Drzewinski et al. |
| 5,284,916 A | 2/1994 | Drzewinski |
| 5,292,809 A | 3/1994 | Drzewinski et al. |
| 5,306,778 A | 4/1994 | Ishida et al. |
| 5,354,796 A | 10/1994 | Creecy et al. |
| 5,412,036 A | 5/1995 | Traugott et al. |
| 5,446,103 A | 8/1995 | Traugott et al. |
| 5,449,557 A | 9/1995 | Liebler et al. |
| 5,451,650 A | 9/1995 | Siol et al. |
| 5,473,019 A | 12/1995 | Siol et al. |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

Kim et al., electronic translation of KR 1020130149586, Jun. 2015.*
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 dated Nov. 8, 2011, pp. 1-10.
Chinese Office Action in commonly owned Chinese Application No. 200910211954 dated Jun. 23, 2011, pp. 1-5.

(Continued)

*Primary Examiner* — Jeffrey C Mullis
(74) *Attorney, Agent, or Firm* — Additon, Higgins & Pendleton, P.A.

(57) ABSTRACT

A thermoplastic resin composition includes (A) a rubber-modified vinyl-based graft copolymer, (B) a silicone-modified aromatic vinyl-based copolymer, and (C) an aromatic vinyl-unsaturated nitrile-based copolymer. The thermoplastic resin composition can exhibit low-gloss characteristics and a synergistic effect of impact resistance and heat resistance.

17 Claims, 1 Drawing Sheet

(56) References Cited

U.S. PATENT DOCUMENTS

| | | |
|---|---|---|
| 5,475,053 A | 12/1995 | Niessner et al. |
| 5,574,099 A | 11/1996 | Noro et al. |
| 5,605,962 A | 2/1997 | Suzuki et al. |
| 5,627,228 A | 5/1997 | Kobayashi |
| 5,635,565 A | 6/1997 | Miyajima et al. |
| 5,643,981 A | 7/1997 | Yang et al. |
| 5,672,645 A | 9/1997 | Eckel et al. |
| 5,731,390 A | 3/1998 | van Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,423,767 B1 | 7/2002 | Weber et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,595,825 B1 * | 7/2003 | De Wilde ............ A63H 33/067 403/348 |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,557,912 B2 | 10/2013 | Chung et al. |
| 8,735,490 B2 | 5/2014 | Chung et al. |
| 9,090,767 B2 | 7/2015 | Park et al. |
| 9,365,671 B2 | 6/2016 | Kim et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0115794 A1 | 8/2002 | Singh et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0097648 A1 * | 5/2004 | Nakai ................ C08F 265/04 525/63 |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2005/0253277 A1 | 11/2005 | Yamanaka et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0074148 A1 | 4/2006 | Ahn et al. |
| 2006/0100307 A1 | 5/2006 | Uerz et al. |
| 2007/0055017 A1 | 3/2007 | Schultes et al. |
| 2007/0100073 A1 | 5/2007 | Lee et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0168315 A1 | 7/2010 | Park et al. |
| 2010/0168354 A1 | 7/2010 | Hong et al. |
| 2010/0240831 A1 | 9/2010 | Kim et al. |
| 2010/0256288 A1 | 10/2010 | Kim et al. |
| 2011/0003918 A1 | 1/2011 | Eckel et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0157866 A1 | 6/2011 | Li et al. |
| 2011/0159293 A1 | 6/2011 | Park et al. |
| 2011/0160377 A1 | 6/2011 | Chung et al. |
| 2011/0160380 A1 | 6/2011 | Kwon et al. |
| 2011/0230610 A1 | 9/2011 | Schultes et al. |
| 2012/0016068 A1 * | 1/2012 | Chung .................. C08L 25/12 524/504 |
| 2013/0328149 A1 | 12/2013 | Dkaniwa et al. |
| 2014/0187717 A1 | 7/2014 | Kwon et al. |
| 2014/0275366 A1 | 9/2014 | Chirino et al. |
| 2015/0152205 A1 * | 6/2015 | Kim ...................... C08L 33/20 526/279 |
| 2015/0216787 A1 | 8/2015 | Hori et al. |
| 2015/0376315 A1 * | 12/2015 | Jang ..................... C08L 25/12 525/72 |
| 2015/0376386 A1 * | 12/2015 | Kim ...................... C08L 25/12 525/72 |
| 2015/0376392 A1 | 12/2015 | Kim et al. |
| 2015/0376402 A1 | 12/2015 | Kim et al. |
| 2015/0376403 A1 | 12/2015 | Kwon et al. |
| 2016/0137837 A1 | 5/2016 | Kwon et al. |

FOREIGN PATENT DOCUMENTS

| | | |
|---|---|---|
| CN | 101768331 A | 7/2010 |
| CN | 102115564 A | 7/2011 |
| CN | 102153848 A | 8/2011 |
| CN | 102329462 A | 1/2012 |
| CN | 102974324 A | 3/2013 |
| CN | 104072659 A | 10/2014 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0107015 A1 | 5/1984 |
| EP | 0149813 | 7/1985 |
| EP | 0370344 A2 | 5/1990 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0721962 A2 | 7/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |

(56) References Cited

FOREIGN PATENT DOCUMENTS

| | | |
|---|---|---|
| EP | 1010725 A2 | 6/2000 |
| EP | 1 069 156 A1 | 1/2001 |
| EP | 1069154 A | 1/2001 |
| EP | 1117742 | 7/2001 |
| EP | 1209163 A1 | 5/2002 |
| EP | 2204412 A1 | 7/2010 |
| GB | 1042783 A1 | 9/1966 |
| JP | 59-149912 A | 8/1984 |
| JP | 69-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-226576 A | 8/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |
| JP | 2006-257284 A | 9/2006 |
| JP | 2006-342246 A | 12/2006 |
| JP | 2007-023227 | 2/2007 |
| JP | 2008-292853 A1 | 12/2008 |
| JP | 2014-040512 A | 3/2014 |
| KR | 1994-0014647 | 7/1994 |
| KR | 1996-14253 A | 5/1996 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 10-0360710 B1 | 10/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 10-2006-0109470 A | 10/2006 |
| KR | 648114 B1 | 11/2006 |
| KR | 10-0666797 B1 | 1/2007 |
| KR | 10-0767428 B1 | 10/2007 |
| KR | 10-2008-0036790 A | 4/2008 |
| KR | 10-885819 B1 | 2/2009 |
| KR | 2009-0029539 A | 3/2009 |
| KR | 10-902352 | 6/2009 |
| KR | 10-2011-0079489 A | 7/2011 |
| KR | 10-2012-006839 A | 1/2012 |
| KR | 10-2012-0042026 A | 5/2012 |
| KR | 10-2012-0078417 A | 7/2012 |
| KR | 10-2013-0076616 A | 7/2013 |
| KR | 10-2013-0078747 A | 7/2013 |
| WO | 0 449 689 A1 | 10/1991 |
| WO | 99 19383 A1 | 4/1999 |
| WO | 99/57198 A1 | 11/1999 |
| WO | 00/6648 A1 | 2/2000 |
| WO | 00/18844 A1 | 4/2000 |
| WO | 00 00544 A1 | 1/2001 |
| WO | 01/66634 A | 9/2001 |
| WO | 00 09518 A1 | 2/2002 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 | 1/2007 |
| WO | 2007/119920 A1 | 10/2007 |
| WO | 101061179 A | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A | 10/2009 |

OTHER PUBLICATIONS

English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 dated Dec. 14, 2011, pp. 1-9.
European Search Report in commonly owned European Application No. 09180634 dated Feb. 2, 2010, pp. 1-3.
Xu, "Predicition of Refractive Indices of Linear 3651-8659 Polymers by a four-descriptor QSPR model", Polymer, 45 (2004) pp. 8651-8659.
European Search Report in commonly owned European Application No. 10196806 dated Apr. 27, 2011, pp. 1-5.
Office Action in commonly owned U.S. Appl. No. 12/631,018 dated Apr. 26, 2012, pp. 1-12.
Office Action in commonly owned U.S. Appl. No. 12/642,904 dated Mar. 27, 2012, pp. 1-7.
Notice of Allowance in commonly owned U.S. Appl. No. 12/642,904 dated Jul. 2, 2012, pp. 1-8.
Office Action in commonly owned U.S. Appl. No. 12/817,302 dated Mar. 29, 2012, pp. 1-5.
Office Action in commonly owned U.S. Appl. No. 12/884,549 dated Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report in commonly owned European Application No. 08873329.0 dated Dec. 14, 2012, pp. 1-7.
Office Action in commonly owned U.S. Appl. No. 12/972,795 dated Jan. 18, 2013, pp. 1-9.
International Search Report in commonly owned International Application No. PCT/KR2008/07825 dated Aug. 28, 2009, pp. 1-2.
Machine translation of JP 2006-257284, pp. 1-27.
Office Action in commonly owned U.S. Appl. No. 12/880,209 dated Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 dated Jul. 29, 2011, pp. 1-9.
Advisory Action in commonly owned U.S. Appl. No. 12/880,209 dated Nov. 4, 2011, pp. 1-4.
International Search Report in commonly owned International Application No. PCT/KR2008/007157, dated May 28, 2009.
Final Office Action in commonly owned U.S. Appl. No. 12/792,176 dated Apr. 19, 2012, pp. 1-10.

(56) References Cited

OTHER PUBLICATIONS

Advisory Action in commonly owned U.S. Appl. No. 12/792,176 dated Aug. 23, 2012, pp. 1-4.
European Search Report in commonly owned European Application No. 08873425.6 dated May 29, 2012, pp. 1-5.
Notice of Allowance in commonly owned U.S. Appl. No. 12/880,209 dated Oct. 10, 2013, pp. 1-10.
Paris et al., "Glass Transition Temperature of Allyl Methacrylate-n-Butyl Acrylate Gradient Copolymers in Dependence on Chemical Composition and Molecular Weight", Journal of Polymer Science, Part A (2007) pp. 1-11.
Wunderlich, "Thermal Analysis of Polymeric Materials", Springer, New York, US (2005) pp. 1-5.
Search Report in commonly owned European Patent Application No. EP 01 27 4302 dated Mar. 4, 2005, pp. 1-4.
Office Action in commonly owned U.S. Appl. No. 11/768,592 dated Apr. 8, 2009, pp. 1-9.
Notice of Allowance in commonly owned U.S. Appl. No. 11/647,101 dated Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Office Action in commonly owned U.S. Appl. No. 12/961,877 dated Jul. 30, 2012, pp. 1-14.
European Search Report in commonly owned European Application No. 14194463.7 dated Apr. 23, 2015, pp. 1-2.
Office Action in commonly owned U.S. Appl. No. 14/557,478 dated Jun. 4, 2015, pp. 1-9.
Final Office Action in commonly owned U.S. Appl. No. 14/557,478 dated Oct. 30, 2015, pp. 1-6.
Notice of Allowance in commonly owned U.S. Appl. No. 14/557,478 dated Feb. 18, 2016, pp. 1-5.
Office Action in commonly owned U.S. Appl. No. 14/749,861 dated Nov. 20, 2015, pp. 1-17.
Final Office Action in commonly owned U.S. Appl. No. 14/749,861 dated May 31, 2016, pp. 1-9.
Notice of Allowance in commonly owned U.S. Appl. No. 14/749,861 dated Aug. 25, 2016, pp. 1-7.
Office Action in commonly owned U.S. Appl. No. 14/747,176 dated Apr. 11, 2016, pp. 1-8.
Final Office Action in commonly owned U.S. Appl. No. 14/747,176, dated Jul. 27, 2016, pp. 1-6.
Notice of Allowance in commonly owned U.S. Appl. No. 14/747,176 dated Oct. 7, 2016, pp. 1-6.
European Search Report for commonly owned European Application No. EP 04808586, dated Sep. 25, 2007.
Chinese Office Action in commonly owned Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
Advisory Action in commonly owned U.S. Appl. No. 12/631,018 dated Nov. 7, 2012, pp. 1-3.
Final Office Action in commonly owned U.S. Appl. No. 12/817,302 dated Feb. 7, 2013, pp. 1-6.
Final Office Action in commonly owned U.S. Appl. No. 12/884,549 dated Dec. 18, 2012, pp. 1-7.
Notice of Allowance in commonly owned U.S. Appl. No. 12/884,549 dated Apr. 11, 2013, pp. 1-8.
European Search Report in commonly owned European Application No. 07024808, dated Mar. 18, 2008, pp. 1-2.
Machine Translation of JP 10-017762.
Derwent Abstract of JP 2002348457 (A) (2003).
Full English Translation of JP-10-017762 (2011).
Advisory Action in commonly owned U.S. Appl. No. 12/817,302 dated May 16, 2013, pp. 1-5.
Office Action in commonly owned U.S. Appl. No. 12/898,012 dated Dec. 21, 2012, pp. 1-6.
Notice of Allowance in commonly owned U.S. Appl. No. 12/972,795 dated May 24, 2013, pp. 1-8.
European Search Report in commonly owned European Application No. 10194938.6 dated Jul. 21, 2011, pp. 1-5.
Notice of Allowance in commonly owned U.S. Appl. No. 12/961,877 dated Jun. 19, 2013, pp. 1-10.
Final Office Action in commonly owned U.S. Appl. No. 12/961,877 dated Nov. 28, 2012, pp. 1-10.
Advisory Action in commonly owned U.S. Appl. No. 12/961,877 dated Mar. 12, 2013, pp. 1-2.
Silicones: An Introduction to Their Chemistry and Application, The Plastics Institute 1962, p. 27.
Extended European Search Report in commonly owned European Application No. 09180865.9, dated Apr. 16, 2010.
Search Report in commonly owned Chinese Application No. 201310737841.6 dated Apr. 22, 2015, pp. 1-2.
Baek et al., electronic translation of KR 10-666797, Jan. 2007, pp. 1-6.
Non-Final Office Action in commonly owned U.S. Appl. No. 14/097,538 dated Mar. 26, 2015, pp. 1-11.
Non-Final Office Action in commonly owned U.S. Appl. No. 14/097,538 dated Aug. 11, 2015, pp. 1-6.
Final Office Action in commonly owned U.S. Appl. No. 14/097,538 dated Nov. 23, 2015, pp. 1-7.
Notice of Allowance in commonly owned U.S. Appl. No. 14/097,538 dated Mar. 30, 2016, pp. 1-9.
Extended Search Report in commonly owned European Application No. 15194797.5 dated Mar. 18, 2016, pp. 1-7.
Non-Final Office Action in commonly owned U.S. Appl. No. 14/930,954 dated Oct. 18, 2016, pp. 1-13.
Non-Final Office Action in commonly owned U.S. Appl. No. 14/750,364 dated Jun. 16, 2016, pp. 1-7.
Notice of Allowance in commonly owned U.S. Appl. No. 14/750,364 dated Oct. 6, 2016, pp. 1-8.
Non-Final Office Action in commonly owned U.S. Appl. No. 14/748,576 dated Feb. 16, 2016, pp. 1-9.
Notice of Allowance in commonly owned U.S. Appl. No. 14/748,576 dated Jun. 29, 2016, pp. 1-9.
Office Action in commonly owned U.S. Appl. No. 12/792,176 dated Nov. 16, 2011, pp. 1-12.
Office Action in commonly owned U.S. Appl. No. 14/749,861 dated Jan. 9, 2017, pp. 1-8.
Office Action in commonly owned U.S. Appl. No. 14/930,954 dated Apr. 17, 2017, pp. 1-13.
Office Action in commonly owned U.S. Appl. No. 14/747,176 dated May 10, 2017, pp. 1-6.

* cited by examiner

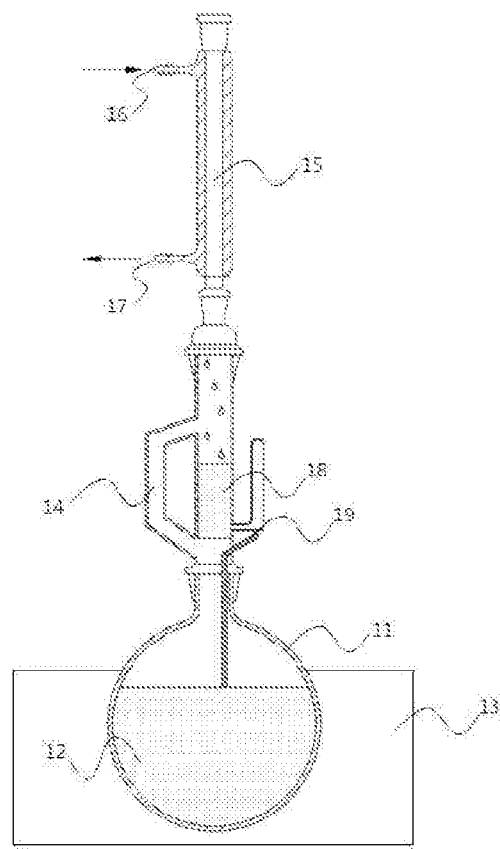

THERMOPLASTIC RESIN COMPOSITION

CROSS-REFERENCE TO RELATED APPLICATION

This application claims priority under 35 USC Section 119 to and the benefit of Korean Patent Application Nos. 10-2014-0078894, filed on Jun. 26, 2014, and 10-2014-0139220, filed on Oct. 15, 2014, in the Korean Intellectual Property Office, the entire disclosure of each of which is incorporated herein by reference.

FIELD OF THE INVENTION

The present invention relates to a thermoplastic resin composition.

BACKGROUND

Thermoplastic resins have lower specific gravity than glass or metals, and also have excellent mechanical properties such as moldability, impact resistance, and the like. Plastic products prepared using such thermoplastic resins have rapidly replaced glass and metals in various fields, including electric and electronic products, automobile parts, etc.

In recent years, there has been an increasing demand for products having a low-gloss appearance. Gloss-less paint has been applied to the surface of plastic products to provide a low gloss surface. There are, however, environmental concerns associated with the same. Accordingly, there has been an increased demand for low-gloss resins.

Conventionally, low-gloss resins have been prepared by using or modifying large-sized rubber particles. However, such a method can have problems, for example, the low-gloss effect can be poor, and impact strength and heat resistance can be degraded.

As another method, a method of graft-polymerizing a monomer such as ethylenically unsaturated carboxylic acid onto a resin to prepare a copolymer has been used. This copolymer can have various good physical properties, but heat resistance thereof can suddenly degrade.

U.S. Pat. No. 4,460,742 discloses a low-gloss resin composition in which a cross-linked copolymer is used. Such a resin composition can have a matte appearance when large-sized rubber particles or a matting agent is added. However, the resin composition can require an excessive amount of the matting agent, which can degrade impact strength and temperature resistance.

SUMMARY

Exemplary embodiments provide a thermoplastic resin composition capable of realizing a synergistic effect of impact resistance and heat resistance while maintaining excellent low-gloss characteristics.

Exemplary embodiments also provide a molded article including the thermoplastic resin composition.

Exemplary embodiments of the thermoplastic resin composition include (A) a rubber-modified vinyl-based graft copolymer, (B) a silicone-modified aromatic vinyl-based copolymer, and (C) an aromatic vinyl-unsaturated nitrile-based copolymer.

In exemplary embodiments, the thermoplastic resin composition may include (A) the rubber-modified vinyl-based graft copolymer in an amount of about 10 to about 40% by weight, (B) the silicone-modified aromatic vinyl-based copolymer in an amount of about 5 to about 40% by weight, and (C) the aromatic vinyl-unsaturated nitrile-based copolymer in an amount of about 40 to about 80% by weight.

In exemplary embodiments, (B) the silicone-modified aromatic vinyl-based copolymer may include (b1) an aromatic vinyl-based monomer, (b2) an unsaturated nitrile-based monomer, and (b3) a cross-linkable monomer.

In exemplary embodiments, (B) the silicone-modified aromatic vinyl-based copolymer may include (b1) the aromatic vinyl-based monomer in an amount of about 55 to about 80% by weight, (b2) the unsaturated nitrile-based monomer in an amount of about 15 to about 40% by weight, and (b3) the cross-linkable monomer in an amount of about 0.1 to about 10% by weight.

In exemplary embodiments, (b3) the cross-linkable monomer may be represented by the following Formula 1.

[Formula 1]

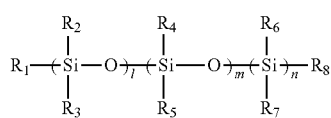

In Formula 1, l, m and n are the same or different and are each independently an integer ranging from 0 to 100 (provided that l, m and n are not zero at the same time), and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

In exemplary embodiments, (b3) the cross-linkable monomer may be represented by the following Formula 2.

[Formula 2]

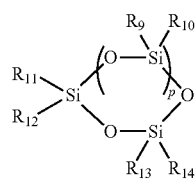

In Formula 2, $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

In exemplary embodiments, (b3) the cross-linkable monomer may include at least one selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof.

In exemplary embodiments, (b3) the cross-linkable monomer may have a weight average molecular weight of about 150 to about 6,000 g/mol.

In exemplary embodiments, (B) the silicone-modified aromatic vinyl-based copolymer may be prepared from a mixture further including at least one multifunctional vinyl-based compound selected from the group consisting of divinyl polydimethylsiloxane, vinyl-modified dimethylsiloxane, divinylbenzene, ethylene glycol di(meth)acrylate, allyl(meth)acrylate, diallylphthalate, diallylmalate, triallylisocyanurate, and mixtures thereof.

In exemplary embodiments, (b1) the aromatic vinyl-based monomer may include at least one aromatic vinyl-based compound selected from the group consisting of styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and mixtures thereof.

In exemplary embodiments, (b2) the unsaturated nitrile-based monomer may include at least one unsaturated nitrile-based compound selected from the group consisting of acrylonitrile, methacrylonitrile, ethacrylonitrile, phenylacrylonitrile, α-chloroacrylonitrile, fumaronitrile, and mixtures thereof.

In exemplary embodiments, (B) the silicone-modified aromatic vinyl-based copolymer may have an insoluble content of about 15 to about 30% by weight, as measured by a Soxhlet extraction method.

In exemplary embodiments, (B) the silicone-modified aromatic vinyl-based copolymer has a silicon content of about 0.01 to about 2.0% by weight, as measured by an X-ray fluorescence (XRF) spectrometer.

In exemplary embodiments, (B) the silicone-modified aromatic vinyl-based copolymer may have a glass transition temperature ($T_g$) of about 95 to about 115° C.

The molded article according to exemplary embodiments may include the thermoplastic resin composition.

The molded article according to exemplary embodiments can have a surface hardness (Rs) of about 100 to about 115, as measured by an evaluation method according to ASTM D785, and can have a gloss of about 50 or less, as measured at an angle of 60° by an evaluation method according to ASTM D523.

The molded article according to exemplary embodiments can have an Izod impact strength of about 8 to about 20 kgf·cm/cm, as measured for a ⅛ inch-thick specimen under notched conditions by an evaluation method according to ASTM D256, and can have a surface hardness (Rs) of about 100 to about 115, as measured by an evaluation method according to ASTM D785.

The molded article according to exemplary embodiments can have a Vicat softening temperature (VST) of about 101 to about 110° C., as measured for a ¼ inch-thick specimen under conditions of a load of 5 kg and a rate of 50° C./hr by an evaluation method according to ISO 306B50.

BRIEF DESCRIPTION OF DRAWINGS

FIG. 1 is a diagram showing a Soxhlet extraction reactor used to measure cross-linking of a silicone-modified aromatic vinyl-based copolymer according to one exemplary embodiment of the present invention.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a thermoplastic resin composition capable of remarkably improving impact resistance and/or heat resistance while maintaining low-gloss characteristics according to exemplary embodiments will be described in detail. However, it should be understood that the detailed description provided herein is given by way of illustration only, and is not intended to limit the scope of the present invention in any way. Also, unless specifically stated otherwise, all the technical and scientific terms used in this specification have the same meanings as what are generally understood by a person skilled in the related art to which the present invention belongs. In the following description, detailed descriptions of well-known functions or constructions will be omitted since they would obscure the invention in unnecessary detail.

In the present invention, the weight average molecular weight (units: g/mol) of a powder sample is measured using gel permeation chromatography (GPC; Agilent Technologies 1200 series) after the sample is dissolved in tetrahydrofuran (THF). In this case, Shodex LF-804 (8.0.1.D.×300 mm) and polystyrene (Shodex Co. Ltd.) are used as a column and a standard sample, respectively.

The present inventors have conducted research on thermoplastic resin compositions having low-gloss characteristics, and found a thermoplastic resin composition capable of realizing a synergistic effect of impact resistance and heat resistance while exhibiting low-gloss characteristics when the composition includes an aromatic vinyl based copolymer including a compound including two or more unsaturated reactive groups. Therefore, the present invention has been completed based on these facts.

The thermoplastic resin composition can include (A) a rubber-modified vinyl-based graft copolymer, (B) a silicone-modified aromatic vinyl-based copolymer, and (C) an aromatic vinyl-unsaturated nitrile-based copolymer.

Hereinafter, the respective components will be described in further detail.

(A) Rubber-Modified Vinyl-Based Graft Copolymer

The rubber-modified vinyl-based graft copolymer may be combined with other components in the composition to improve impact strength, mechanical hardness, and/or appearance characteristics. The thermoplastic resin composition may include the rubber-modified vinyl-based graft copolymer in an amount of about 10 to about 40% by weight, for example about 15 to about 30% by weight, based on the total weight (100% by weight) of the thermoplastic resin composition. In some embodiments, the thermoplastic resin composition may include the rubber-modified vinyl-based graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments, the amount of the rubber-modified vinyl-based graft copolymer can be in a range from about any of the foregoing amounts to about any other of the foregoing amounts.

When the content of the rubber-modified vinyl-based graft copolymer is less than this range, impact strength may be degraded. On the other hand, when the content of the rubber-modified vinyl-based graft copolymer is greater than this range, fluidity may be deteriorated.

The rubber-modified vinyl-based graft copolymer may be prepared by graft-polymerizing a mixture including a rubbery polymer, an aromatic vinyl-based monomer, and an unsaturated nitrile-based monomer.

In exemplary embodiments, the rubber-modified vinyl-based graft copolymer may be prepared by graft-polymerizing about 30 to about 70% by weight of a mixture of the aromatic vinyl-based compound and the unsaturated nitrile-based compound in the presence of about 30 to about 70% by weight of the rubbery polymer by means of an emulsion polymerization method.

The rubbery polymer may have an average particle size of about 0.1 to about 10 µm, for example about 0.2 to about 1.0 µm. Within this particle size range, impact strength, mechanical hardness and/or miscibility can be good.

Examples of the rubbery polymer that may be used herein may include without limitation polybutadiene rubbers, acrylic rubbers, ethylene/propylene rubbers, styrene/butadiene rubbers, acrylonitrile/butadiene rubbers, isoprene rubbers, ethylene-propylene-diene monomer (EPDM) rubbers, polyorganosiloxane/polyalkyl(meth)acrylate rubber complexes, and the like, and mixtures thereof. In exemplary embodiments, the rubbery polymer can include a polybutadiene rubber.

In the mixture graft-polymerized onto the rubbery polymer, examples of the aromatic vinyl-based monomer that may be used herein may include without limitation styrene, $C_1$ to $C_{10}$ alkyl-substituted styrene, halogen-substituted styrene, vinyltoluene, vinylnaphthalene, and the like, and combinations thereof. Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and combinations thereof. In exemplary embodiments, the aromatic vinyl-based monomer may include styrene.

In the mixture graft-polymerized onto the rubbery polymer, examples of the unsaturated nitrile-based monomer that may be used herein may include without limitation acrylonitrile, methacrylonitrile, fumaronitrile, and the like, and combinations thereof. In exemplary embodiments, the unsaturated nitrile-based monomer may include acrylonitrile.

Also, a monomer such as a $C_1$ to $C_8$ methacrylic acid alkyl ester, a $C_1$ to $C_8$ acrylic acid alkyl ester, a maleic anhydride, and the like and mixtures thereof may be further added to the grafted rubbery polymer, and the resulting mixture may be subjected to the graft polymerization. Each of the $C_1$ to $C_8$ methacrylic acid alkyl ester and the $C_1$ to $C_8$ acrylic acid alkyl ester is an alkyl ester of methacrylic acid or acrylic acid which is an ester obtained from a monohydric alcohol having 1 to 8 carbon atoms. Examples of these esters may include without limitation methyl (meth)acrylate, ethyl (meth)acrylate, and/or propyl (meth)acrylate.

Examples of the rubber-modified vinyl-based graft copolymer can include without limitation an acrylonitrile-butadiene-styrene graft copolymer (g-ABS).

(B) Silicone-Modified Aromatic Vinyl-Based Copolymer

The thermoplastic resin composition may include the silicone-modified aromatic vinyl-based copolymer (C) in an amount of about 5 to about 40% by weight, based on the total weight (100% by weight) of the thermoplastic resin composition. In some embodiments, the thermoplastic resin composition may include the silicone-modified aromatic vinyl-based copolymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments, the amount of the silicone-modified aromatic vinyl-based copolymer can be in a range from about any of the foregoing amounts to about any other of the foregoing amounts.

Within this content range, matting characteristics may be excellent, and impact resistance and/or heat resistance may also be improved.

The silicone-modified aromatic vinyl-based copolymer may include (b1) an aromatic vinyl-based monomer in an amount of about 55 to about 80% by weight, (b2) an unsaturated nitrile-based monomer in an amount of about 15 to about 40% by weight, and (b3) a cross-linkable monomer in an amount of about 0.1 to about 10% by weight, each based on the total weight (100% by weight) of the mixture of monomers used to prepare the silicone-modified aromatic vinyl-based copolymer. Within this content range, matting characteristics may be excellent, and impact resistance and/or heat resistance may also be improved.

In some embodiments, the silicone-modified aromatic vinyl-based copolymer may include (b1) the aromatic vinyl-based monomer in an amount of about 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments, the amount of the (b1) the aromatic vinyl-based monomer can be in a range from about any of the foregoing amounts to about any other of the foregoing amounts.

In some embodiments, the silicone-modified aromatic vinyl-based copolymer may include (b2) the unsaturated nitrile-based monomer in an amount of about 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments, the amount of the (b2) the unsaturated nitrile-based monomer can be in a range from about any of the foregoing amounts to about any other of the foregoing amounts.

In some embodiments, the silicone-modified aromatic vinyl-based copolymer may include (b3) the cross-linkable monomer in an amount of about 0.1, 0.2, 0.3, 0.4, 0.5, 0.6, 0.7, 0.8, 0.9, 1.0, 1.1 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0% by weight. Further, according to some embodiments, the amount of the (b3) the cross-linkable monomer can be in a range from about any of the foregoing amounts to about any other of the foregoing amounts.

(b1) Aromatic Vinyl-Based Monomer

Examples of the aromatic vinyl-based monomer that may be used herein may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and mixtures thereof.

In exemplary embodiments, the aromatic vinyl-based monomer that may be used herein may include styrene and/or α-methylstyrene.

The aromatic vinyl-based monomer may be included in an amount of about 55 to about 80% by weight, based on the total weight (100% by weight) of the mixture of monomers used to prepare the silicone-modified aromatic vinyl-based copolymer. In some embodiments, the aromatic vinyl-based monomer may be present in an amount of about 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the aromatic vinyl-based monomer can be in a range from about any of the foregoing amounts to about any other of the foregoing amounts.

When the content of the aromatic vinyl-based monomer is within this range, impact resistance and/or heat resistance of the thermoplastic resin composition may be improved.

(b2) Unsaturated Nitrile-Based Monomer

Examples of the unsaturated nitrile-based monomer that may be used herein may include without limitation acrylonitrile, methacrylonitrile, ethacrylonitrile, phenylacrylonitrile, α-chloroacrylonitrile, fumaronitrile, and the like, and mixtures thereof.

In exemplary embodiments, unsaturated nitrile-based monomer may include acrylonitrile.

The unsaturated nitrile-based compound may be included in an amount of about 15 to about 40% by weight, based on the total weight (100% by weight) of the mixture of monomers used to prepare the silicone-modified aromatic vinyl-based copolymer. In some embodiments, the unsaturated nitrile-based monomer may be present in an amount of about 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the unsaturated nitrile-based monomer can be in a range from about any of the foregoing amounts to about any other of the foregoing amounts.

In exemplary embodiments, the mixture of monomers can include a weight ratio of the aromatic vinyl-based monomer to the unsaturated nitrile-based monomer (aromatic vinyl: unsaturated nitrile) of about 7:3 to about 9:1. Within this weight ratio range, the unsaturated nitrile-based monomer may be combined with other components to improve matting characteristics with minimal or no degradation of mechanical properties and/or molding processability of the thermoplastic resin composition.

(b3) Cross-Linkable Monomer

The cross-linkable monomer may be used to realize excellent matting characteristics while maintaining the various physical properties such as impact resistance, heat resistance, etc.

The cross-linkable monomer may include a compound or a mixture of two or more compounds represented by the following Formula 1:

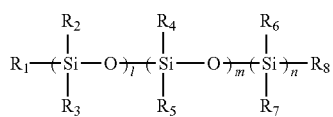

[Formula 1]

wherein in Formula 1, l, m and n are the same or different and are each independently an integer ranging from 0 to 100 (provided that l, m and n are not zero at the same time), and $R_1$ $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$ $R_2$, $R_3$, $R_4$, $R_5$, $R_6$, $R_7$, and $R_8$ include a polymerizable unsaturated reactive group.

The silicone-modified aromatic vinyl-based copolymer may have a ring-shaped structure and may include a compound or a mixture of two or more compounds represented by the following Formula 2:

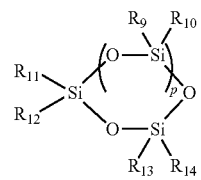

[Formula 2]

wherein in Formula 2, $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

As used herein with reference to the compounds of Formula 1 and/or 2, the term "substituted" means that one or more hydrogen atoms are substituted with one or more substituents, such as but not limited to one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof. As used herein, the term "hetero" refers to a nitrogen, sulfur, oxygen, and/or phosphorus atom in place of a carbon atom.

Examples of the cross-linkable monomer may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri-sec-butyl-1,3,5-trivinyl-cyclotrisiloxane, 1,3,5,7-tetra-sec-butyl-1,3,5,7-tetravinyl-cyclotetrasiloxane, 1,3,5,7,9-penta-sec-butyl-1,3,5,7,9-pentavinyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and a mixture thereof, but the present invention is not particularly limited thereto. For example, at least one selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl- 1,3,5,7-tetravinyl-cyclotetrasiloxane, 1,3,5,7,9-pentaethyl-1,3,5,7,9-pentavinyl-cyclopentasiloxane, and the like, and mixtures thereof. In exemplary embodiments, the cross-linkable monomer may include 1,3,5,7-tetramethyl-1,3,5,7-tetravinyl-cyclotetrasiloxane.

The cross-linkable monomer may be used alone or in combination with other components to realize various excellent physical properties such as impact resistance, heat resistance, and the like as well as matting characteristics which are difficult to achieve using conventional cross-linking agents.

The cross-linkable monomer may have a weight average molecular weight of about 150 to about 6,000 g/mol. When this molecular weight range is satisfied, a cross-linking degree may be easily controlled, and a cross-linking reaction may be smoothly performed to realize excellent matting characteristics.

In exemplary embodiments, the cross-linkable monomer may have a weight average molecular weight of about 150, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, or 6,000 g/mol. Also, the weight average molecular weight of the cross-linkable monomer may be about greater than or equal to one of the values and less than or equal to one of the values.

The cross-linkable monomer may be included in an amount of about 0.1 to about 10% by weight, for example about 1.5 to about 7% by weight, and as another example about 2 to about 5% by weight, based on the total weight (100% by weight) of the silicone-modified aromatic vinyl-based copolymer. In some embodiments, the cross-linkable monomer may be present in an amount of about 0.1, 0.2, 0.3, 0.4, 0.5, 0.6, 0.7, 0.8, 0.9, 1.0, 1.1 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0% by weight. Further, according to some embodiments, the amount of the cross-linkable monomer can be in a range from about any of the foregoing amounts to about any other of the foregoing amounts.

Within this content range, matting characteristics maybe improved with minimal or no degradation of impact resistance and/or heat resistance, and/or uniform matting characteristics may be generally realized.

The silicone-modified aromatic vinyl-based copolymer may be linear or cross-linked. In exemplary embodiments, the silicone-modified aromatic vinyl-based copolymer may be cross-linked. In this case, the cross-linking of the silicone-modified aromatic vinyl-based copolymer may be confirmed by measuring a quantity of an insoluble content of an extract extracted with a solvent using a Soxhlet extraction method. The Soxhlet extraction may be performed using an organic solvent selected from the group consisting of toluene, tetrahydrofuran, ethylacetate, chloroform, and mixtures thereof, but the present invention is not particularly limited thereto. In exemplary embodiments, tetrahydrofuran (THF) may be used.

The Soxhlet extraction may be performed in a Soxhlet extraction reactor using a mixed solution obtained by mixing the silicone-modified aromatic vinyl-based copolymer with a solvent. In exemplary embodiments of the Soxhlet extraction, tetrahydrofuran contained in a container is heated and evaporated using a heater upon extraction. The evaporated tetrahydrofuran is passed through an evaporation line, and supplied into a cooler (including a cooling water inlet port and a cooling water outlet port). The tetrahydrofuran cooled in the cooler is liquefied, and stored in a storage member included in a cylindrical filter. Thereafter, when the tetrahydrofuran is present at an excessive amount such that the tetrahydrofuran is emitted from the storage member through a circulation line and flows in a container through the circulation line, a resin is extracted into the circulating tetrahydrofuran through the cylindrical filter.

The silicone-modified aromatic vinyl-based copolymer is subjected to Soxhlet extraction for about 48 hours using tetrahydrofuran (THF). In this case, the insoluble content remaining after the extraction may be in a range of about 15 to about 30% by weight, for example about 18.8 to about 27.4% by weight.

The silicone-modified aromatic vinyl-based copolymer (B) may have an insoluble content of about 15 to about 30% by weight, as measured by a Soxhlet extraction method. Also, the insoluble content of (B) the silicone-modified aromatic vinyl-based copolymer measured by the Soxhlet extraction method may be about greater than or equal to one of the values and less than or equal to one of the values.

Also, the silicone-modified aromatic vinyl-based copolymer may have a silicon content of about 0.01 to about 2.0% by weight, for example 0.07 to 2.0% by weight, and as another example about 0.07 to about 0.21% by weight, as measured by an X-ray fluorescence (XRF) spectrometer.

In some embodiments, (B) the silicone-modified aromatic vinyl-based copolymer may have a silicon content of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0% by weight, as measured by the X-ray fluorescence spectrometer. Also, the silicone content of (B) the silicone-modified aromatic vinyl-based copolymer measured by the X-ray fluorescence spectrometer may be about greater than or equal to one of the values and less than or equal to one of the values.

In this case, the XRF analysis is fluorescent X-ray spectrometry, that is, a method in which X rays collide with a substance to analyze the wavelength distribution of X rays secondarily emitted from the substance so as to estimate types and composition ratios of component elements in the substance. A conventional apparatus may be used in this analysis. In the present invention, an X-ray fluorescence spectrometer (Model: Axios advanced. Maker: Panalytical (Netherland)) was used.

By way of example, a specimen using the silicone-modified aromatic vinyl-based copolymer is manufactured in a method for analysis of silicon using XRF. Also, an analytical reference specimen is prepared. Silicon (Si) elements included in the reference specimen are measured using X-ray fluorescence (XRF) spectrometry, and a calibration curve of the silicon (Si) elements is plotted. Next, the silicon (Si) elements in the specimen may be measured using X-ray fluorescence (XRF) spectrometry, and subjected to quantitative analysis by applying the silicon (Si) elements to the previously plotted calibration curve.

The silicone-modified aromatic vinyl-based copolymer may have a glass transition temperature ($T_g$) of about 95 to about 115° C., for example about 101 to about 115° C., and as another example about 101.7 to about 103.8° C. In some embodiments, the silicone-modified aromatic vinyl-based copolymer may have a glass transition temperature ($T_g$) of about 95, 96, 97, 98, 99, 100, 101, 102, 103, 104, 105, 106, 107, 108, 109, 110, 111, 112, 113, 114, or 115° C. Also, the glass transition temperature ($T_g$) of the silicone-modified aromatic vinyl-based copolymer may be about greater than or equal to one of the values and less than or equal to one of the values.

Within this temperature range, the thermoplastic resin composition including the silicone-modified aromatic vinyl-based copolymer may exhibit excellent matting characteristics with minimal or no degradation of impact resistance and/or heat resistance.

The silicone-modified aromatic vinyl-based copolymer may be prepared using a conventional polymerization method such as suspension polymerization, emulsion polymerization, solution polymerization, and the like, but the present invention is not particularly limited thereto. Suspension polymerization may be used as one specific example of a method for preparing the copolymer. When the silicone-modified aromatic vinyl-based copolymer is prepared using a suspension polymerization method, an inorganic dispersing agent and/or an organic dispersing agent may be used to improve dispersibility and suspension stability.

Examples of the inorganic dispersing agent that may be used herein may include without limitation aluminum hydroxide, ferric hydroxide, titanium hydroxide, a phosphate-based compound, a carbonate-based compound, a sulfate compound, and the like, and mixtures thereof. For example, a phosphate compound may be used. In exemplary embodiments, a metal phosphate-based inorganic compound, such as tricalcium phosphate and/or trisodium phosphate may be used.

A homopolymer and/or a copolymer of acrylic acid and/or methacrylic acid may be used as the organic dispersing agent. When the copolymer is used as the organic dispersing agent, the content of the acrylic acid and/or methacrylic acid used may be greater than or equal to about 50 parts by weight, based on about 100 parts by weight of the copolymer. Also, the acrylic acid and/or methacrylic acid may be in the form of a salt of sodium, potassium and/or ammonium to maintain proper solubility.

Upon copolymerization of the silicone-modified aromatic vinyl-based copolymer, azobisisobutyronitrile may be used as a polymerization initiator, but the present invention is not particularly limited thereto.

The thermoplastic resin composition including the silicone-modified aromatic vinyl-based copolymer may exhibit excellent matting characteristics with minimal or no degradation of physical properties such as impact resistance, heat resistance, etc.

(C) Aromatic Vinyl-Unsaturated Nitrile-Based Copolymer

The aromatic vinyl-unsaturated nitrile-based copolymer may be a copolymer of an aromatic vinyl-based monomer and an unsaturated nitrile-based monomer.

Examples of the aromatic vinyl-based monomer that may be used herein may include without limitation styrene, a $C_1$ to $C_{10}$ alkyl-substituted styrene, a halogen-substituted styrene, vinyltoluene, vinylnaphthalene, and the like, and combinations thereof. Examples of the alkyl-substituted styrene may include without limitation α-methyl styrene, p-methyl styrene, o-ethyl styrene, m-ethyl styrene, p-ethyl styrene, p-t-butylstyrene, 2,4-dimethylstyrene, and the like, and combinations thereof.

Examples of the unsaturated nitrile-based monomer that may be used herein may include without limitation acrylonitrile, methacrylonitrile, ethacrylonitrile, and the like, and combinations thereof.

Examples of the aromatic vinyl-unsaturated nitrile-based copolymer may include without limitation a copolymer of styrene and acrylonitrile; a copolymer of α-methylstyrene and acrylonitrile; and/or a copolymer of styrene, α-methylstyrene and acrylonitrile, for example, a copolymer of styrene and acrylonitrile.

The thermoplastic resin composition may include the aromatic vinyl-unsaturated nitrile-based copolymer in an amount of about 40 to about 80% by weight, based on the total weight (100% by weight) of the thermoplastic resin composition. In some embodiments, the thermoplastic resin composition may include the aromatic vinyl-unsaturated nitrile-based copolymer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments, the amount of the aromatic vinyl-unsaturated nitrile-based copolymer can be in a range from about any of the foregoing amounts to about any other of the foregoing amounts.

When the content of the aromatic vinyl-unsaturated nitrile-based copolymer is outside of this content range, it can be difficult to secure impact resistance.

The thermoplastic resin composition may optionally further include one or more additives. Examples of the additive may include without limitation surfactants, nucleating agents, coupling agents, filler, plasticizers, impact modifiers, slip agents, antibacterial agents, release agents, thermal stabilizers, antioxidants, photostabilizers, compatibilizing agents, inorganic additives, coloring agents, stabilizers, lubricants, antistatic agents, flame retardants, and the like. The additives may be used alone or in combination.

The thermoplastic resin composition may be prepared in the form of a resin-molded article according to methods for preparing a resin as known in the related art. In exemplary embodiments, the thermoplastic resin composition may be prepared in the form of a pellet by mixing the components together with one or more optional additives, and melt-extruding the resulting mixture in an extruder. Also, a plastic injection- or compression-molded article may be prepared using such a pellet. A molding method is not particularly limited. By way of example, extrusion molding, injection molding, calendar molding, vacuum molding, and the like may all be applied as the molding method.

The present invention provides a molded article prepared from the thermoplastic resin composition.

The molded article can have a surface hardness (Rs) of about 100 to about 115, as measured by an evaluation method according to ASTM D785, and can have a gloss of about 50% or less, as measured at an angle of 60° by an evaluation method according to ASTM D523.

In some embodiments, the molded article may have a surface hardness (Rs) of about 100, 101, 102, 103, 104, 105, 106, 107, 108, 109, 110, 111, 112, 113, 114, or 115, as measured by the evaluation method according to ASTM D785. Also, the surface hardness (Rs) of the molded article measured by the evaluation method according to ASTM D785 may be about greater than or equal to one of the values and less than or equal to one of the values.

The molded article can have an Izod impact strength of about 8 to about 20 kgf·cm/cm, as measured for a ⅛ inch-thick specimen under notched conditions by an evaluation method according to ASTM D256, and can have a surface hardness (Rs) of about 100 to about 115, as measured by an evaluation method according to ASTM D785.

In some embodiments, the molded article may have an Izod impact strength of about 8, 9, 10, 11, 12, 13, 14, 15, 16, 17, 18, 19, or 20 kgf·cm/cm, as measured for the ⅛ inch-thick specimen under notched conditions by the evaluation method according to ASTM D256. Also, the Izod impact strength of the molded article measured for the ⅛ inch-thick specimen under notched conditions by the evaluation method according to ASTM D256 may be about greater than or equal to one of the values and less than or equal to one of the values.

In some embodiments, the molded article may have a surface hardness (Rs) of about 100, 101, 102, 103, 104, 105, 106, 107, 108, 109, 110, 111, 112, 113, 114, or 115, as measured by the evaluation method according to ASTM D785. Also, the surface hardness (Rs) of the molded article measured by the evaluation method according to ASTM D785 may be about greater than or equal to one of the values and less than or equal to one of the values.

The molded article can have a Vicat softening temperature (VST) of about 101 to about 110° C., as measured for a ¼ inch-thick specimen under conditions of a load of 5 kg and a rate of 50° C./hr by an evaluation method according to ISO 306B50.

In some embodiments, the molded article may have a Vicat softening temperature (VST) of about 101, 102, 103, 104, 105, 106, 107, 108, 109, or 110° C., as measured for the ¼ inch-thick specimen under conditions of a load of 5 kg and a rate of 50° C./hr by the evaluation method according to ISO 306B50. Also, the Vicat softening temperature (VST) of the molded article measured for the ¼ inch-thick specimen under conditions of a load of 5 kg and a rate of 50° C./hr by the evaluation method according to ISO 306B50 may be about greater than or equal to one of the values and less than or equal to one of the values.

Hereinafter, exemplary embodiments of the present invention will be described in further detail with reference to the following examples. It should be understood that these examples are provided for illustration only and are not to be construed in any way as limiting the present invention.

Specifications of the respective components used in Examples and Comparative Examples are as follows.

(A) Rubber-Modified Vinyl-Based Graft Copolymer (g-ABS)

A g-ABS resin having a core/shell structure, which is obtained by emulsion-graft-polymerizing styrene and acrylonitrile onto a butadiene rubber having a rubber content of 58% by weight and an average particle size of 2,580 Å, is used.

(B) Silicone-Modified Aromatic Vinyl-Based Copolymer (Cross-Linked SAN)

A styrenic copolymer having a weight average molecular weight of 170,000 g/mol, which is prepared using 2 parts by weight of 1,3,5,7-tetramethyl-1,3,5,7-tetravinyl-cyclotetrasiloxane (SKC Co. Ltd., density: about 0.98 g/ml (20° C.), article name: Vinyl D-4, weight average molecular weight: 344.7 (g/mol)) for 100 parts by weight of a monomer including styrene at 76% by weight and acrylonitrile at 24% by weight, is used.

(C) Aromatic Vinyl-Unsaturated Nitrile Copolymer (SAN)

A styrene-acrylonitrile copolymer (SAN) resin having a weight average molecular weight of 150,000 g/mol, which is copolymerized from 76% by weight of acrylonitrile and 24% by weight of styrene, is used.

Example 1

A mixture, which is was obtained by mixing 0.1 parts by weight of distearyl pentaerythritol diphosphite and 0.03 parts by weight of octadecyl 3-(3,5-di-t-butyl-4-hydroxyphenyl)propionate in a conventional mixing machine, based on 100 parts by weight of a base resin obtained by mixing 25% by weight of (A) the rubber-modified vinyl-based graft copolymer (g-ABS), 65% by weight of (B) the silicone-modified aromatic vinyl-based copolymer (cross-linked SAN), and 10% by weight of (C) the aromatic vinyl-unsaturated nitrile copolymer (SAN), is extruded using a twin-screw extruder having an L/D ratio of 35 and a diameter (Φ) of 45 mm to prepare a pellet. The prepared pellet is dried at 80° C. for 5 hours in a circulating air dryer prior to injection molding, and then molded at an injection temperature of 230° C. in a 10 oz injection molding machine to prepare a specimen for measuring physical properties.

Example 2

A specimen is prepared in the same manner as in Example 1, except that a mixture including (A) the rubber-modified vinyl-based graft copolymer (g-ABS) at 25% by weight, (B) the silicone-modified aromatic vinyl-based copolymer (cross-linked SAN) at 55% by weight, and (C) the aromatic vinyl-unsaturated nitrile copolymer (SAN) at 20% by weight is used as the base resin.

Example 3

A specimen is prepared in the same manner as in Example 1, except that a mixture including (A) the rubber-modified vinyl-based graft copolymer (g-ABS) at 25% by weight, (B) the silicone-modified aromatic vinyl-based copolymer (cross-linked SAN) at 45% by weight, and (C) the aromatic vinyl-unsaturated nitrile copolymer (SAN) at 30% by weight is used as the base resin.

Example 4

A specimen is prepared in the same manner as in Example 1, except that a mixture including (A) the rubber-modified vinyl-based graft copolymer (g-ABS) at 20% by weight, (B) the silicone-modified aromatic vinyl-based copolymer (cross-linked SAN) at 50% by weight, and (C) the aromatic vinyl-unsaturated nitrile copolymer (SAN) at 30% by weight is used as the base resin.

Example 5

A specimen is prepared in the same manner as in Example 1, except that a mixture including (A) the rubber-modified vinyl-based graft copolymer (g-ABS) at 15% by weight, (B) the silicone-modified aromatic vinyl-based copolymer (cross-linked SAN) at 55% by weight, and (C) the aromatic vinyl-unsaturated nitrile copolymer (SAN) at 30% by weight is used as the base resin.

Comparative Example 1

A specimen is prepared in the same manner as in Example 1, except that (D) a C-ABS resin obtained by copolymerizing styrene and acrylonitrile onto a butadiene rubber having a rubber content of 14.5% by weight and an average particle size of 13 μm is used as the base resin.

Comparative Example 2

A specimen is prepared in the same manner as in Example 1, except that a mixture including (A) the rubber-modified vinyl-based graft copolymer (g-ABS) at 25% by weight and (C) the aromatic vinyl-unsaturated nitrile copolymer (SAN) at 75% by weight is used as the base resin.

(2) Melt-Flow Index (MI) (Units: g/10 Min)

The melt-flow index (MI) is measured under conditions of a temperature of 220° C. and a load of 10 kg by an evaluation method according to ASTM D1238.

(3) Vicat Softening Temperature (VST) (Units: ° C.)

The Vicat softening temperature of a ¼ inch-thick specimen is measured under conditions of a load of 5 kgf and a rate of 50° C./hr by an evaluation method according to ISO 306B50.

(4) Surface Hardness (R Scale, Rs)

The surface hardness of a ⅛ inch-thick specimen is measured under notched conditions by an evaluation method according to ASTM D785.

(5) Surface Gloss (Units: %)

The surface gloss is measured at an angle of 60° by an evaluation method according to ASTM D523 using a BYK-Gardner gloss meter commercially available from BYK.

TABLE 1

| Units: % by weight | | Examples | | | | | Comparative Examples | |
|---|---|---|---|---|---|---|---|---|
| | | 1 | 2 | 3 | 4 | 5 | 1 | 2 |
| | (A) | 25 | 25 | 25 | 20 | 15 | — | 25 |
| | (B) | 10 | 20 | 30 | 30 | 30 | — | 75 |
| | (C) | 65 | 55 | 45 | 50 | 55 | — | — |
| | (D) | — | — | — | — | — | 100 | — |
| (B) | Glass transition temperature ($T_g$; ° C.) | 101.7 | 101.7 | 102.4 | 103.1 | 103.8 | — | 100.9 |
| | Insoluble content | 18.8 | 23.1 | 27.4 | 24.5 | 21.6 | — | 14.5 |
| | Silicon content | 0.07 | 0.13 | 0.20 | 0.21 | 0.20 | — | — |

The glass transition temperatures ($T_g$) (units: ° C.) of (B) the silicone-modified aromatic vinyl-based copolymers prepared in Examples 1 to 5 and Comparative Examples 1 and 2 are measured as follows: The copolymers are first heated to a temperature of 160° C. at a rate of 20° C./min using Q2910 commercially available from TA Instruments Co. Ltd., slowly cooled, maintained at an equilibrium state at 50° C., and heated to a temperature of 160° C. at a rate of 10° C./min. Then, an inflection point in the endothermic transition curve is determined as the glass transition temperature.

The insoluble contents (% by weight) of (B) the silicone-modified aromatic vinyl-based copolymers prepared in Examples 1 to 5 and Comparative Examples 1 and 2 are determined as follows: The copolymers are subjected to Soxhlet extraction for 48 hours using tetrahydrofuran (THF), and the insoluble contents remaining after the extraction are then measured.

The silicon contents (% by weight) of (B) the silicone-modified aromatic vinyl-based copolymers prepared in Examples 1 to 5 and Comparative Examples 1 and 2 are measured using an X-ray fluorescence spectrometer (XRF; Model: Axios advanced. Maker: Panalytical (Netherland)).

Evaluations (1) Izod Impact Strength (Units: Kgf·Cm/Cm)

The Izod impact strength of a ⅛ inch-thick specimen is measured under notched conditions by an evaluation method according to ASTM D256.

TABLE 2

| | IZOD (kgf · cm/cm) | MI (g/10 min) | VST (° C.) | Surface hardness (Rs) | Gloss (%) |
|---|---|---|---|---|---|
| Example 1 | 17.8 | 8.9 | 101.7 | 104.5 | 46 |
| Example 2 | 19.6 | 4.9 | 101.7 | 103.7 | 30 |
| Example 3 | 19.6 | 2.6 | 102.4 | 103.8 | 26 |
| Example 4 | 16.8 | 3.9 | 101.2 | 110.1 | 29 |
| Example 5 | 8.7 | 4.9 | 101.8 | 112.9 | 31 |
| Comparative Example 1 | 8.3 | 6.9 | 98.5 | 85.3 | 31 |
| Comparative Example 2 | 25.2 | 15.1 | 100.9 | 104.4 | 92 |

The specimens of Examples 1 to 5 have excellent heat resistance and impact resistance while maintaining low-gloss characteristics. In addition, the specimen of Example 5 exhibits high temperature resistance without degrading impact resistance even when the rubber content is low in the resin.

The specimen of Comparative Example 1 exhibits low-gloss characteristics, but has degraded impact resistance and heat resistance, and the specimen of Comparative Example 2 did not exhibit low-gloss characteristics, and also had degraded heat resistance since the styrenic copolymer (cross-linked SAN) including the silicon-based compound including two or more unsaturated reactive groups is not used.

Although the present invention has been described in detail with reference to embodiments thereof, the embodiments of the present invention are provided to aid in understanding the present invention and are not intended to limit the scope of the present invention. Therefore, it will be appreciated by those skilled in the art that various changes and modifications may be made in these embodiments without departing from the scope of the invention.

Therefore, the scope of the prevent invention is defined not by the detailed description, but by the claims and their equivalents, and all variations within the scope of the claims and their equivalents are to be construed as being included in the scope of the prevent invention.

REFERENCE NUMERALS

| | |
|---|---|
| 11: container | 12: tetrahydrofuran |
| 13: heater | 14: evaporation line |
| 15: cooler | 16: cooling water inlet port |
| 17: cooling water outlet port | 18: cylindrical filter |
| 19: circulation line | |

What is claimed is:

1. A thermoplastic resin composition comprising:
(A) a rubber-modified vinyl-based graft copolymer,
(B) a silicone-modified aromatic vinyl-based copolymer consisting of (b1) an aromatic vinyl-based monomer, (b2) an unsaturated nitrile-based monomer, (b3) a cross-linkable monomer, and optionally at least one multifunctional vinyl-based compound that is not the same as the (b1) aromatic vinyl-based monomer, the (b2) unsaturated nitrile-based monomer, and the (b3) cross-linkable monomer, wherein the multifunctional vinyl-based compound is divinyl polydimethylsiloxane, vinyl-modified dimethylsiloxane, divinylbenzene, ethylene glycol di(meth)acrylate, allyl(meth)acrylate, diallylphthalate, diallylmalate, triallylisocyanurate, or a mixture thereof, and
(C) an aromatic vinyl-unsaturated nitrile-based copolymer,
wherein (B) the silicone-modified aromatic vinyl-based copolymer has an insoluble content of about 15 to about 30% by weight, as measured by a Soxhlet extraction method for about 48 hours using tetrahydrofuran (THF), and a glass transition temperature ($T_g$) of about 95 to about 115° C., and
wherein a molded article made using the thermoplastic resin composition has an Izod impact strength of about 8 to about 20 kgf·cm/cm, as measured for a ⅛ inch-thick specimen under notched conditions according to ASTM D256 and a melt-flow index (MI) of 2.6 to 8.9 g/10 min, as measured at a temperature of 220° C. and a load of 10 kg according to ASTM D1238.

2. The thermoplastic resin composition of claim 1, wherein the composition comprises (A) the rubber-modified vinyl-based graft copolymer in an amount of about 10 to about 40% by weight, (B) the silicone-modified aromatic vinyl-based copolymer in an amount of about 5 to about 40% by weight, and (C) the aromatic vinyl-unsaturated nitrile-based copolymer in an amount of about 40 to about 80% by weight.

3. The thermoplastic resin composition of claim 1, wherein (B) the silicone-modified aromatic vinyl-based copolymer consists of (b1) the aromatic vinyl-based monomer in an amount of about 55 to about 80% by weight, (b2) the unsaturated nitrile-based monomer in an amount of about 15 to about 40% by weight, and (b3) the cross-linkable monomer in an amount of about 0.1 to about 10% by weight.

4. The thermoplastic resin composition of claim 1, wherein (b3) the cross-linkable monomer is represented by the following Formula 1:

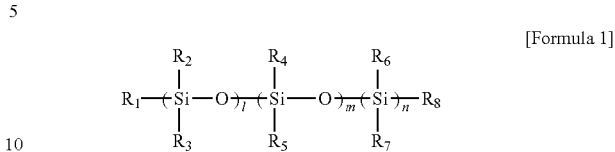

[Formula 1]

wherein l, m and n are the same or different and are each independently an integer ranging from 0 to 100, provided that l, m and n are not zero at the same time, and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

5. The thermoplastic resin composition of claim 1, wherein (b3) the cross-linkable monomer is represented by the following Formula 2:

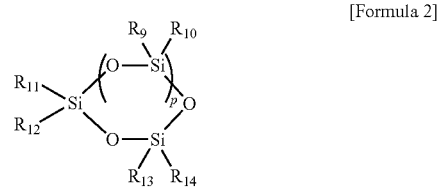

[Formula 2]

wherein $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and
p is an integer ranging from 1 to 6, provided that at least two of $R_9$, $R_{10}$, $R_{11}$, $R_{12}$, $R_{13}$, and $R_{14}$ include a polymerizable unsaturated reactive group.

6. The thermoplastic resin composition of claim 1, wherein (b3) the cross-linkable monomer comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof.

7. The thermoplastic resin composition of claim 1, wherein (b3) the cross-linkable monomer has a weight average molecular weight of about 150 to about 6,000 g/mol.

8. The thermoplastic resin composition of claim 1, wherein (b1) the aromatic vinyl-based monomer comprises styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, or a mixture thereof.

9. The thermoplastic resin composition of claim 1, wherein (b2) the unsaturated nitrile-based monomer comprises acrylonitrile, methacrylonitrile, ethacrylonitrile, phenylacrylonitrile, α-chloroacrylonitrile, fumaronitrile, or a mixture thereof.

10. The thermoplastic resin composition of claim 1, wherein (B) the silicone-modified aromatic vinyl-based copolymer has a silicon content of about 0.01 to about 2.0% by weight, as measured by an X-ray fluorescence spectrometer.

11. A molded article comprising the thermoplastic resin composition of claim 1.

12. The molded article of claim 11, wherein the molded article has a surface hardness (Rs) of about 100 to about 115, as measured by an evaluation method according to ASTM D785, and has a gloss of about 50% or less, as measured at an angle of 60° by an evaluation method according to ASTM D523.

13. The molded article of claim 11, wherein the molded article has an Izod impact strength of about 8 to about 20 kgf·cm/cm, as measured for a ⅛ inch-thick specimen under notched conditions by an evaluation method according to ASTM D256, and has a surface hardness (Rs) of about 100 to about 115, as measured by an evaluation method according to ASTM D785.

14. The molded article of claim 11, wherein the molded article has a Vicat softening temperature (VST) of about 101 to about 110° C., as measured for a ¼ inch-thick specimen under conditions of a load of 5 kg and a rate of 50° C./hr by an evaluation method according to ISO 306B50.

15. The thermoplastic resin composition of claim 1, wherein:

the rubber-modified vinyl-based graft copolymer (A) includes a polybutadiene rubbery polymer;

the silicone-modified aromatic vinyl-based copolymer (B) includes (b3) a cross-linkable monomer represented by the following Formula 2:

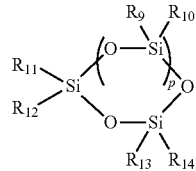

[Formula 2]

wherein $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group; and the silicone-modified aromatic vinyl-based copolymer (B) further optionally includes at least one multifunctional vinyl-based compound comprising divinyl polydimethylsiloxane.

16. The thermoplastic resin composition of claim 1, wherein a molded article made using the thermoplastic resin composition has an Izod impact strength of 8 to about 20 kgf·cm/cm, as measured for a ⅛ inch-thick specimen under notched conditions according to ASTM D256.

17. A molded article comprising the thermoplastic resin composition of claim 16.

* * * * *

UNITED STATES PATENT AND TRADEMARK OFFICE
CERTIFICATE OF CORRECTION

PATENT NO. : 9,902,850 B2
APPLICATION NO. : 14/747207
DATED : February 27, 2018
INVENTOR(S) : Bo Eun Kim et al.

Page 1 of 1

It is certified that error appears in the above-identified patent and that said Letters Patent is hereby corrected as shown below:

On the Title Page

Page 3 item (56) under Foreign Patent Documents delete "WO 0 449 689 A1 10/1991" and insert:
-- EP 0 449 689 A1 10/1991 --

Page 3 item (56) under Foreign Patent Documents delete "WO 101061179 A1 10/2007" and insert:
-- CN 101061179 A1 10/2007 --

Signed and Sealed this
Thirty-first Day of July, 2018

Andrei Iancu
*Director of the United States Patent and Trademark Office*